United States Patent Office 3,600,467
Patented Aug. 17, 1971

3,600,467
PROCESS OF PREPARING GRAFT
INTERPOLYMERS
Jules Darcy, Sarnia, Ontario, and Paul Grenville Palmer, Acton, Ontario, Canada, assignors to Polymer Corporation Limited, Sarnia, Ontario, Canada
No Drawing. Filed Nov. 17, 1967, Ser. No. 683,810
Claims priority, application Canada, Nov. 28, 1966, 976,538
Int. Cl. C08f 15/04
U.S. Cl. 260—880
6 Claims

ABSTRACT OF THE DISCLOSURE

Graft interpolymers of a vinyl aromatic monomer such as styrene, a butadiene-1,3 hydrocarbon and a vinyl nitrile monomer such as acrylonitrile are prepared by polymerization of the grafting monomers in the presence of the butadiene-1,3 hydrocarbon in solution in an aromatic hydrocarbon solvent, to a predetermined conversion of from 20–40%.

---

This invention relates to graft interpolymers prepared from rubbery materials and monovinyl aromatic compounds. More specifically it relates to resinous graft interpolymers comprising a backbone of a rubbery polymer derived at least in part from a butadiene hydrocarbon monomer, with a polymer derived from a monovinyl aromatic monomer and a vinyl nitrile monomer grafted thereon.

Typical graft interpolymers of this type, and in connection with which the present invention will be particularly described, are those derived from the monomers butadiene-1,3, styrene and acrylonitrile. Such interpolymers are well known in the art and are commonly referred to as ABS resins. They consist mainly of a backbone of polybutadiene onto which have been grafted "branches" of styrene-acrylonitrile copolymers. A satisfactory combination of properties, namely impact strength, tensile strength, melt flow and solvent resistance, is exhibited by resins of composition within the ranges butadiene 15 to 20 weight percent, styrene 50 to 60 weight percent, and acrylonitrile 15 to 30 weight percent.

An object of the present invention is to provide graft interpolymers of rubbery materials and monovinyl aromatic compounds having an improved combination of properties, and a process for their preparation.

It has now been discovered that graft interpolymers, or resins, of this type having an improved combination of physical properties can be prepared by polymerizing the grafting monomers in solution, to a low conversion, in the presence of a backbone rubbery polymeric material derived from the solution polymerization or copolymerization of butadiene-1,3.

The butadiene-1,3 hydrocarbon most useful in the present invention is butadiene-1,3 itself. However, hydrocarbon derivatives of butaidene-1,3 such as isoprene and dimethyl butadiene can also be useful. The process of the invention uses pre-formed polymers or copolymers of these diolefins, but only those produced by solution polymerization methods. Such methods are well known in the art and do not form a part of the present invention.

The preferred conjugated diolefin polymers are block copolymers of butadiene-1,3 and styrene which comprise homo-polymeric terminal blocks of styrene and a center block of homo-polymeric butadiene. One method of preparing these block copolymers is by the "step-wise addition" method, which involves adding the monomers to a living polymer solution initiated by means of butyl lithium. In this method, styrene is polymerized in solution in an inert organic solvent using a butyl lithium initiator, under anhydrous and oxygen-free conditions. Then, after complete polymerization of the styrene, and without deactivating the solution, anhydrous butadiene is added to the solution of living polystyrene. The butadiene polymerizes onto the end of the living polystyrene, to form a living two-block copolymer. The addition of further anhydrous styrene to this solution after complete polymerization of the butadiene, without deactivating the solution, results in the formation of a three-block copolymer of form polystyrene-polybutadiene-polystyrene. Also by this technique, copolymers having larger numbers of blocks can be formed, and such copolymers are also useful in this invention.

By varying this technique and adding the different monomer before complete polymerization of the previous monomer charge, one can produce block copolymers in which some of the blocks are random copolymers. Such block copolymers, e.g. of form polystyrene-poly(butadiene/styrene)-polystyrene, are commonly known as "overlap" block copolymers. They are also useful in this invention.

A three-block copolymer can also be prepared by solution polymerization methods by a "coupling" method. In this method, living block copolymers are treated with a reagent which causes coupling of two-block copolymer molecules through their living ends. Thus three-block copolymers of form polystyrene-polybutadiene-polystyrene may be formed by preparing a solution of living two-block copolymers by first charging styrene and after complete polymerization then adding butadiene, and after complete polymerization of the butadiene, coupling the two-block copolymers by means of a coupling reagent. Suitable such reagents include carbon dioxide, carbon monoxide, carbonyl sulphide, carbon disulphide and halogens. Five-blocks copolymers can be similarly made by coupling living three-block copolymers.

Non-linear or "star-shaped" block copolymers are also useful in this invention. These are block copolymers in which three or more linear block copolymer branches radiate from a common centre. These materials are formed by coupling living block copolymers with a coupling reagent having more than two active centres. An example of such a coupling reagent is silicon tetrachloride. When a solution containing living two-block copolymers is treated with silicon tetrachloride, more than 2 copolymer molecules are believed to couple through a silicon atom, which acts as a common centre. This process is described in the Journal of Polymer Science (A3), 93 (1965) by R. P. Zelinski and C. F. Wofford.

Another polybutadiene rubber which is useful in the process of this invention is a high cis-1,4 content polybutadiene prepared by solution polymerization methods. These rubbers are produced in solution using Ziegler catalysts, which generally comprise a compound of a heavy metal in combination with an organo-metallic reducing agent of a metal of Groups I, II or III of the Periodic Table. Suitable heavy metals are titanium, cobalt and nickel, and suitable organometallic compounds are the lower alkyl compounds of lithium, magnesium and aluminum. The catalyst system chosen must be one which produces a predominantly cis-1,4 polybutadiene, otherwise the material is not sufficiently rubbery for use in this invention. Such systems are known in the art, typical ones being titanium tetraiodide and aluminum trialkyl, and cobalt di-chloride and aluminum dialkyl monochloride. The polymerization generally takes place in solution in an inert organic solvent, and under substantially anhydrous and oxygen-free conditions.

A further rubber useful in the present invention is a random copolymer of butadiene and styrene produced in solution, commonly known as solution SBR. This material is produced by dissolving the monomers in an inert organic solvent and polymerizing them together by means of an anionic polymerization initiator such as metallic lithium or a lithium hydrocarbon compound. If desired a small amount of a polar substance is added to enhance the randomness of the resultant product. This copolymerization also takes place under substantially anhydrous conditions.

All these different kinds of rubber have the common characteristics that they are produced by solution polymerization methods, and are based on a butadiene-1,3 monomer. All these materials are useful in the present invention, as will be demonstrated in the practical examples hereinafter, and they are of course used in their raw form, without any curing, compounding, etc.

The preferred vinyl aromatic monomer for use in the grafting step is styrene, and the preferred vinyl nitrile monomer is acrylonitrile. Whilst chemically similar compounds may replace these two monomers, e.g. vinyl toluene or vinyl naphthalene may replace styrene and methacrylonitrile may replace acrylonitrile, the monomers styrene and acrylonitrile show great advantages in terms of ready availability and cost, and give a product of eminently satisfactory properties. The invention will be further described in connection with butadiene-1,3, styrene and acrylonitrile.

The preferred procedure according to the invention is generally as follows. The rubber to be used as the backbone of the graft copolymer is dissolved in a mixture of aromatic hydrocarbon solvent and monomeric styrene which is to be grafted onto the rubber. Liquid monomeric acrylonitrile is then added to this solution of rubber in monomer and solvent. A graft polymerization initiator such as cumene hydroperoxide, and a chain transfer agent such as a mercaptan are added, and the solution is polymerized to the predetermined degree of conversion. The reaction product so formed is then extracted from the solution, dried and pressed.

The preferred aromatic hydrocarbon solvent is ethyl benzene. It is preferred to use this solvent in small amounts, a suitable amount being about ½ of the weight of the graft copolymerization monomers. This is sufficient initially to dissolve the backbone rubber and generally to prevent deposition of solid material on addition of acrylonitrile, whereas excessive amounts unduly prolong the reaction. Even with this suitable amount of solvent, it is occasionally found that the addition of acrylonitrile to the solution causes precipitation. If this occurs, it is desirable to warm the solution, whereupon the solid matter readily re-dissolves.

In the practice of the process of this invention, the predetermination of the degree of conversion is conveniently effected by predetermination of the maximum solids content of the reaction solution. The solids content increases as the degree of conversion increases. The graft copolymerization reaction mixture is made up of a backbone rubber, solvent, monomeric styrene and monomeric acrylonitrile. The only solid present initially is the backbone rubber, as the other components are all liquids. The solids content increases as the reaction proceeds, being made up of the resin which is formed. Thus the solids level increases in proportion to the degree of conversion of the monomers, and so predetermination of the desired solids level is in effect predetermination of the desired degree of conversion for a given reaction solution.

Solids contents of higher than about 35% should be avoided, as such solutions are too viscous to be handled easily. A solids content of about 25% can be conveniently handled and at this level the degree of conversion can be chosen within the range 20–40% and the preferred amount of solvent used in the reaction mixture.

In the process of the invention therefore samples are withdrawn from the reaction mixture at intervals and the solids content is determined. As soon as a sample is obtained having the correct or approximately the correct solids content, the reaction is stopped by pouring the reaction solution into an excess of ethanol. The product is precipitated as a fine crumb in ethanol, and is extracted, dried and pressed.

It is convenient to refer to the composition of the graft thermoplastic interpolymer in terms of the weight percentage of the monomeric constituents in it which is in the range acrylonitrile 28–33 weight percent, butadiene 16–20 weight percent and styrene 47–54 weight percent. The styrene content of the products of the present invention may be contributed in part by the amount of styrene present in the backbone rubber.

The method by which the composition of the reaction mixture and the solids level are calculated in order to give a product of the desired composition at the desired degree of conversion by the method of the invention will be better understood from the following theoretical examples.

Firstly, suppose it is required to produce a graft interpolymer resin containing 20% by weight of butadiene, 25% by weight of acrylonitrile and 55% by weight of styrene, from a solution polymerized polybutadiene, and 25% solids level is the maximum which will be handled. Starting from 10 grams of polybutadiene rubber, the final weight of the resin must be 50 grams, in order to give the required butadiene content. As the copolymerization is to be stopped at 25% solids level, the total weight of the reaction mixture has to be 200 grams, made up of 10 grams of backbone rubber, some solvent and some monomers.

As previously noted it has been found that a suitable amount of solvent is about ½ the weight of the combined grafting monomers. In this case therefore the weight of solvent will be about 63 grams and the combined weight of styrene and acrylonitrile will be about 127 grams. Also, the total weight of the product will be 50 grams, of which 40 grams will be polymerized styrene and acrylonitrile. The degree of conversion of the graft copolymerization reaction is therefore $40/127$ or 31.5%, and this was predetermined by fixing the solids level and the amount of solvent.

The proportions of styrene and acrylonitrile making up the total 127 grams in this example must have regard for the amount of each monomer which is required in the product, and the relative reactivities of the two monomers. This determination is complicated by the fact that styrene is more reactive than acrylonitrile. Although it is required that the graft interpolymer resin contain more than twice as much styrene as acrylonitrile, the relative proportions of monomers added must be reversed. The ratio of acrylonitrile to styrene in the monomer mixture is generally between 4.5:1 and 1.2:1. In the above hypothetical example it is to be expected that the ratio would be about 1.25:1. When the backbone rubber contains smaller amounts of butadiene, for example when it is a block copolymer containing 50% butadiene and 50% styrene, this ratio will be nearer the high end of this range.

The correct ratio of acrylonitrile to styrene is determined by trial experiments, after all other conditions have been established. Then a ratio within the range hereinbefore set out can be chosen, the polymerization carried out and the product analyzed for acrylonitrile content. If this value turns out to be lower than required, then the ratio should be increased. By such experiments, the correct ratio can readily be found.

It is also worthy of note that, as styrene polymerizes more readily than acrylonitrile, resins produced at higher conversions will tend to have higher acrylonitrile contents than those produced at lower conversions from the same relative mixture of styrene and acrylonitrile and under otherwise the same conditions.

As a second example, suppose that it is required to produce a resin containing 20% by weight of butadiene, 25% by weight of acrylonitrile and 55% by weight of styrene from a backbone rubber comprising a block copolymer of 60 weight percent butadiene and 40 weight percent styrene. In this case, the 10 grams of backbone rubber to be used as the starting material contains 6 grams of butadiene, and so the total weight of resin to give the necessary butadiene content will be 30 grams.

For a final solids content of 25% in this case, the total weight of the reaction mixture must be 120 grams, and this is contributed by 10 grams of backbone rubber and 110 grams of monomers and solvent. The amount of solvent equal to ½ the total weight of the monomers will be about 37 grams, and the total weight of monomers will be about 73 grams. The degree of conversion in this case will be $20/73$ or 27.4%, which again was fixed by the choice of final solids content and amount of solvent.

The ratio of acrylonitrile to styrene in the monomer mixture required to give the desired composition of the resin must again be determined by experimentation, but it will again lie within the range 4.5:1 to 1.2:1. It is to be expected that, owing to the existence of some styrene in the backbone rubber, the correct ratio will lie towards the upper end of this range.

The suitable initiators of free radical polymerization which may be used in the graft copolymerization process of the invention, are well known in the art, and include organic peroxides and hydroperoxides. One suitable initiator is cumene hydroperoxide (CHP), which decomposes to give free radicals at a suitably low temperature for ease of handling and control of the process. Using CHP, the graft copolymerization process may be initiated at temperatures of about 65° C. upwards. The reaction proceeds more slowly the lower the reaction temperature and so the reaction can be controlled by varying the temperature. It has been found desirable to polymerize at temperatures no higher than about 70° C., for better control and ease of stopping the reaction at the desired solids level. With CHP as initiator for example, after initiation at 65° C., the temperature may be lowered to about 50° C., and the reaction continued until the required solids level has been reached. Temperatures as low as 10° C. can be used. There is no need to use special pressure equipment at temperatures of 70° C. or below. A further advantage of the process of the invention is that the reaction is completed generally in less than 3 hours.

In common with other free radical initiated polymerization processes, it is preferable to use a chain transfer agent or modifier to regulate the molecular weights of the products. Otherwise, as is well known, in polymerizations of this type the products will have a very high molecular weight, which is undesirable. A suitable chain transfer agent is a mercaptan or a mixture of mercaptans, such as linear dodecyl mercaptan, or a mixture of this mercaptan with others having from 10 to 14 carbon atoms. Only small amounts of such mercaptan, for example about 0.1% by weight based on the total weight of monomers and rubber, is required.

The products of the invention show an outstanding combination of physical properties which are important in commercial applications of such resins, namely impact strength, melt flow, tensile strength and resistance to solvents. Those prepared from block copolymer backbone rubbers also have the unexpected property that they are transparent. After moulding and pressing, the products are virtually colorless and show extremely good clarity. By the use of suitable color stabilizing additives, the clarity of the products can be further improved and protected against degradation on ageing. This property is not only of importance in commercial applications where clear transparent materials are required, but it also simplifies the pigmenting process as compared to cases where one must start from a white or colored opaque resin. The test for transparency herein is whether a compression moulded disc of the product, about $1/10$ inch thickness is transparent to news-print, i.e. if such a disc is held 36 inches above news-print such print will be clear and readable through the disc.

The impact strength of the product is measured by means of the Charpy test, which is a standard ASTM procedure. In this procedure, a bar of length approximately 5 inches, breadth ½ inch and thickness ¼ inch is moulded from the resin, and a notch of known depth is cut into one side of the bar. The bar is then supported horizontally on a pair of supports, one disposed towards each end of the bar. Each support also comprises a backstop, and the notched side of the bar is pressed up against these backstops. The bar is then struck by means of a freely swinging pendulum on the un-notched side, at a position approximately opposite that of the notch, with a force sufficient to break the bar. The energy lost by the pendulum in breaking the bar is measured, from its degree of angular travel after the breaking impact, and from this the Charpy impact strength of the bar is reported in terms of foot pounds per linear inch depth of the notch. Values of 9 or above are readily obtained in the products of the invention.

The melt flow index of the resin is measured according to the standard ASTM procedure, on a Davenport Polythene Melt Indexer apparatus, which involves loading a cylinder with the molten resin at 220° C., and forcing the resin through an aperture of diameter of 0.0825 inch in the cylinder by means of pressure applied by a plunger loaded with a weight of 10 kilograms. The melt flow index is reported as the weight of resin in grams issuing through the aperture per 10 minutes. These resins should have both a high impact strength and a high melt flow index, but it has previously proved difficult to improve one of these properties except at the expense of the other, so that a good value for both these properties is difficult to attain. The products of the present invention are etxremely good in this respect.

The tensile strength is measured on microdumbells of the resin of thickness of 0.025 inch and width of 0.10 inch. These are stretched on the well-known Instron tester, and values of tensile strength at yield and tensile strength at break, are measured. It should be noted however that these materials generally have a lower tensile strength at break than their value of tensile strength at yield. On first stretching the sample under test, at a certain stress value the resin yields. On yielding the stress decreases. When the stress in the yielded resin is again increased, the resin generally breaks before reaching the stress value at the yield point.

The invention will be further described with reference to specific examples.

In each example the degree of conversion of the grafting monomers was fixed by fixing the final solids level at a manageable value, and fixing the amount of solvent. Also, butadiene refers to unsubstituted butadiene-1,3 in each case.

EXAMPLE I

In this example graft interpolymers were prepared according to the invention, using as the backbone rubber a block copolymer of form polystyrene-polybutadiene-polystyrene, prepared by the step-wise addition method. The initiator used was n-butyl lithium. The polymer contained 60 weight percent butadiene and 40 weight percent styrene, and had an intrinsic viscosity in toluene at room temperature of approximately 1.0.

From 10 grams of this backbone rubber, it was desired to produce a graft interpolymer of butadiene, styrene and acrylonitrile, of approximate composition butadiene 17 weight percent, styrene 53 weight percent, and acrylonitrile 30 weight percent by the method of the invention. For ease of handling of the reaction solution, it was decided that the solids content of the reaction solution should not exceed 25%.

Calculations were then carried out as previously outlined, to determine the required amounts of monomers and ethylene benzene solvent (equal to ½ the weight of the grafting monomers) to give the desired product. By trial experiments, it was found that the suitable ratio by weight of acrylonitrile to styrene required to give the desired product in this example was 2.33:1.

As a result of these calculations and experiments, the reaction solution was made up of the following ingredients, in a polymerization bottle:

SBS block copolymer rubber—10 grams
Styrene—26.0 grams
Acrylonitrile—60.7 grams
Ethyl benzene—43.3 grams
Linear dodecyl mercaptan (20% w./v. solution in ethyl benzene)—1.45 ccs.
Cumene hydroperoxide (c. 72%)—0.29 ccs.

This reaction mixture was heated to 65° C. to decompose the cumene hydroperoxide and so to initiate the graft copolymerization reaction. After reaction for 1½ hours at this temperature, the polymerization mixture was allowed to cool and polymerize at room temperature. After a total reaction time of 1 hour and 50 minutes, the reaction was stopped by pouring the reaction mixture into ethanol.

During the graft copolymerization reaction, samples were withdrawn at intervals and the solids content of the solution was measured on the samples. The reaction was stopped when the solids content reached 25%. By this sampling technique, of course, it is not always possible to stop the reaction at the exact solids content required, due to the delay in testing the samples, but one can stop within 1% of the desired solids content.

Two duplicate samples were prepared with the above recipe and reaction conditions, with the minor exception that the second bottle attained the desired solids level after 1½ hours instead of 1 hour and 50 minutes. Each yielded a fine white crumb of polymer, which upon compression moulding gave a clear, colorless sample, which easily passed the transparency test previously outlined.

The samples were analyzed for content of monomers, and physical tests were carried out on the compression moulded products. The results are given in Table I.

TABLE I

| Sample fix | A | B |
|---|---|---|
| Reaction time (minutes) | 110 | 90 |
| Total yield (grams) | 35.5 | 36.3 |
| Target solids (percent) | 25 | 25 |
| Stopped solids (percent) | 25.0 | 25.73 |
| Weight percent acrylonitrile | 30.10 | 29.95 |
| Weight percent butadiene | 16.9 | 16.55 |
| Weight percent styrene | 53.0 | 53.5 |
| Tensile at break (p.s.i.) | 3,740 | 4,750 |
| Tensile at yield (p.s.i.) | 5,375 | 4,708 |
| Elongation at break (percent) | 20 | 169 |
| Melt Flow Index (grams/10 minutes) | 5.87 | 5.83 |
| Charpy Test at room temperature | >11.44 | >11.44 |

The figure of 11.44 for the result of the Charpy test indicates the maximum reading which it was possible to obtain with the instrument used. In other words, under test methods normally employed for measuring the impact strength of these ABS materials, these resins could not be broken. The figure is thus reported as greater than 11.44. It will be appreciated that the figures given in Table I represent an outstanding combination of physical properties for this type of material.

EXAMPLE II

In this example, an "overlap" block copolymer of butadiene and styrene, prepared by the method previously described, was used as the backbone rubber.

The overlap block copolymer contained 67 weight percent butadiene and 33 weight percent styrene. It had an intrinsic viscosity of 0.69, measured in toluene at room temperature, and a tensile strength of 3510 p.s.i. It was desired to make a graft interpolymer by the method of this invention having the composition butadiene 17 weight percent, styrene 53 weight percent and acrylonitrile 30 weight percent, stopping the reaction when the reaction solution attained 25% solids level. By the method previously outlined, the amount of monomers required for the reaction mixture, starting from 10 grams of backbone rubber, was calculated. A reaction mixture was then made up of the following ingredients:

Overlap block copolymer—10 grams
Ethyl benzene solvent—49.0 grams
Total weight of grafting monomers—97 grams
Linear dodecyl mercaptan (20% w./v. solution in EtBz)—1.45 ccs.
Cumene hydroperoxide (c. 72 percent)—0.29 ccs.

The amount of solvent was fixed at approximately ½ the combined weight of grafting monomers. The correct ratio of styrene to acrylonitrile in the reaction mixture necessary to give the desired product was not known exactly, but on the basis of other experiments was expected to be about 1:2. Two experiments were therefore carried out with the above reaction mixture, one using 32 grams of styrene and 65 grams of acrylonitrile and the other using 35 grams of styrene and 62 grams of acrylonitrile. Both gave a graft interpolymer of approximately the right composition, the former one being slightly closer to that desired than the latter.

The procedure was as outlined for Example I, and the results obtained on analysis and physical testing of the products are given in Table II.

TABLE II

| Run | A | B |
|---|---|---|
| Reaction time (minutes) | 130 | 115 |
| Weight of styrene (percent) | 32 | 35 |
| Weight of acrylonitrile (percent) | 65 | 62 |
| Total yield (grams) | 39.5 | 39.0 |
| Target solids (percent) | 25 | 25 |
| Stopped solids (percent) | 25.05 | 24.5 |
| Percent acrylonitrile | 30.4 | 29.3 |
| Percent butadiene | 16.95 | 17.2 |
| Percent styrene | 52.65 | 53.5 |
| Tensile at break (p.s.i.) | 5,280 | 5,120 |
| Tensile at yield (p.s.i.) | 4,795 | 4,554 |
| Elongation at break (percent) | 105 | 109 |
| Melt Flow Index (grams/10 minutes) | 5.81 | 4.14 |
| Charpy Test, at room temperature | >11.44 | >11.44 |

The measured physical properties are again an indication of an outstanding material of this type. The products also easily passed the transparency test previously outlined.

EXAMPLE III

In this example, a "coupled" block copolymer prepared by the method previously described and coupled by reaction of living two-block copolymers with carbon dioxide was used as the backbone rubber. This block copolymer comprised 35 weight percent styrene and 65 weight percent butadiene. Its intrinsic viscosity was 0.89 and its tensile strength 3500 p.s.i.

To obtain a graft interpolymer by the process of the present invention of approximate composition acrylonitrile 30 weight percent, butadiene 17 weight percent and styrene 53 weight percent the following polymerization recipe was used on the basis of calculations:

Coupled block copolymer—10 grams
Ethyl benzene solvent—46 grams
Total weight of graft monomers—92 grams
Linear dodecyl mercaptan (20% w./v. solution in EtBz)—1.45 ccs.
Cumene hydroperoxide (c. 72 percent)—0.20 ccs.

Two runs were carried out using different ratios of styrene to acrylonitrile, to obtain a product of the desired composition. The procedure was as described in connection with Examples I and II. The results are given in Table III.

TABLE III

| Run | A | B |
|---|---|---|
| Reaction time (minutes) | 180 | 120 |
| Weight of styrene (grams) | 30.6 | 29.2 |
| Weight of acrylonitrile (grams) | 61.4 | 62.8 |
| Total yield (grams) | 36.3 | 35.6 |
| Target solids (percent) | 25 | 25 |
| Stopped solids (percent) | 24.61 | 23.92 |
| Percent acrylonitrile (by weight) | 29.5 | 29.7 |
| Percent butadiene (by weight) | 17.9 | 18.25 |
| Percent styrene (by weight) | 52.6 | 52.05 |
| Tensile at break (p.s.i.) | 4,260 | 4,533 |
| Tensile at yield (p.s.i.) | 3,678 | 3,960 |
| Elongation at break (percent) | 69 | 105 |
| Melt Flow Index (grams/10 minutes) | 4.88 | 3.36 |
| Charpy Test, at room temperature | >11.44 | >11.44 |

These products also easily passed the transparency test previously outlined.

EXAMPLE IV

In this example, the backbone rubber used was a "star-shaped" polymer, prepared by coupling living two-block copolymers of butadiene and styrene with silicon tetrachloride, by the method previously described. A molar ratio of silicon tetrachloride to lithium in the initiator of 4.34 was used to effect the coupling reaction. The star-shaped block copolymer so formed contained 34 weight percent styrene and 66 weight percent butadiene, and had an intrinsic viscosity of 0.99.

The polymerization recipe for the process of the invention, as determined by calculation on the basis that the reaction was to be stopped when the solids content of the reaction solution reached 25%, was as follows:

Star-shaped block copolymer rubber—10 grams
Ethyl benzene solvent—49.0 grams
Combined weight of grafting monomers—97.0 grams
Linear dodecyl mercaptan (20% w./v. solution in EtBz)—1.45 ccs.
Cumene hydroperoxide (c. 72 percent)—0.20 ccs.

As in Examples II and III, two runs were carried out with different grafting monomer ratios. The procedure was as described in the previous examples. The results are given in Table IV.

TABLE IV

| Run | A | B |
|---|---|---|
| Reaction time (minutes) | 105 | 81 |
| Weight of styrene (grams) | 32 | 35 |
| Weight of acrylonitrile (grams) | 65 | 62 |
| Total yield (grams) | 40.2 | 36.0 |
| Target solids (percent) | 25 | 25 |
| Stopped solids (percent) | 25.2 | 26.1 |
| Percent acrylonitrile (by weight) | 30.9 | 28.4 |
| Percent styrene (by weight) | 52.7 | 53.3 |
| Percent butadiene (by weight) | 16.4 | 18.3 |
| Tensile at break (p.s.i.) | 5,615 | 5,014 |
| Tensile at yield (p.s.i.) | 6,025 | 5,255 |
| Elongation at break (percent) | 98 | 86 |
| Melt Flow Index (grams/10 minutes) | 11.56 | 8.96 |
| Charpy Test, at room temperature | >11.44 | >11.44 |

These products also passed with ease the transparency test previously outlined. The results of the physical testing indicate an ABS resin with an outstanding combination of physical properties.

EXAMPLE V

In this example, the backbone rubber was high cis-1,4 content (98%) polybutadiene, produced by solution polymerization using a cobalt-containing catalyst.

The procedure was as previously described in the other examples, the following polymerization recipe being used for the grafting:

Weight of polybutadiene backbone rubber—6.3 grams
Weight of ethyl benzene solvent—43.7 grams
Combined weight of grafting monomers—90 grams
Linear dodecyl mercaptan (20% w./v. solution in EtBz)—1.45 ccs.
Cumene hydroperoxide (c. 72 percent)—0.29 ccs.

In this example, four runs were undertaken using different ratios of styrene to acrylonitrile, to find the correct ratio for obtaining a product of the desired composition. These ratios, and the results obtained on testing and analyzing the products are reported in Table V.

TABLE V

| Run | A | B | C | D |
|---|---|---|---|---|
| Reaction time (minutes) | 135 | 105 | 115 | 120 |
| Weight of styrene (grams) | 30 | 25 | 35 | 40 |
| Weight of acrylonitrile (grams) | 60 | 65 | 55 | 50 |
| Total yield (grams) | 34.4 | 35.5 | 34.4 | 35.5 |
| Target solids (percent) | 25 | 25 | 25 | 25 |
| Stopped solids (percent) | 24.42 | 24.33 | 24.8 | 24.7 |
| Percent acrylonitrile (by weight) | 32.6 | 35.4 | 30.8 | 29.9 |
| Percent butadiene (by weight) | 18.3 | 17.8 | 18.3 | 17.74 |
| Percent styrene (by weight) | 49.1 | 46.8 | 50.9 | 52.36 |
| Tensile at break (p.s.i.) | 4,160 | 3,945 | 3,305 | 3,238 |
| Tensile at yield (p.s.i.) | 4,580 | 3,695 | 3,562 | 3,135 |
| Elongation at break (percent) | 20 | 25 | 70 | 55 |
| Melt Flow Index (grams/10 minutes) | 2,795 | 3.35 | 4.16 | 4.88 |
| Charpy Test, at room temperature | 7.57 | 0.98 | 5.44 | 6.24 |

These products did not pass the transparency test previously described. The product of Run B has an unsatisfactory impact strength as shown by its Charpy test result. This is in large part attributable to its composition. It will be noted that its styrene content was low and its acrylonitrile content was high, giving an off-specification product. This is due to incorrect choice of styrene to acrylonitrile ratio in the polymerization recipe. The other products are on-specification as regards their composition, and their physical properties are markedly improved as a result.

EXAMPLE VI

A solution prepared random copolymer of butadiene and styrene was used as the backbone rubber in this example. This copolymer was prepared by the method previously described, using a lithium initiator. The polymer comprised 75 weight percent butadiene, 25 weight percent styrene.

As a result of calculations carried out by the method previously described, the following polymerization recipe was used:

Solution SBR backbone rubber—9 grams
Ethyl benzene solvent—48.6 grams
Combined weight of grafting monomers—97.2 grams
Linear dodecyl mercaptan (20% w./v. solution in EtBz)—1.35 ccs.
Cumene hydroperoxide (c. 72 percent)—0.21 ccs.

This recipe is based on the objective of preparing a graft interpolymer of approximate composition acrylonitrile 30%, butadiene 18% and styrene 52%, and stopping the reaction when the reaction solution reaches a solids content of 25%.

Three runs were carried out with different styrene to acrylonitrile ratios to obtain this desired composition, and the results are reported in Table VI. These products did not pass the transparency test.

TABLE VI

| Run | A | B | C |
|---|---|---|---|
| Reaction time (minutes) | 135 | 210 | 175 |
| Weight of styrene (grams) | 32.4 | 34.2 | 36.0 |
| Weight of acrylonitrile (grams) | 64.8 | 63.0 | 61.2 |
| Total yield (grams) | 40.3 | 38.5 | 37.5 |
| Target solids (percent) | 25 | 25 | 25 |
| Stopped solids (percent) | 25.95 | 25.2 | 25.1 |
| Percent acrylonitrile (by weight) | 31.3 | 30.0 | 29.2 |
| Percent butadiene (by weight) | 18.6 | 19.5 | 20.0 |
| Percent styrene (by weight) | 51.5 | 50.5 | 50.8 |
| Tensile at break (p.s.i.) | 4,213 | 3,918 | 3,309 |
| Tensile at yield (p.s.i.) | 4,136 | 3,773 | 3,209 |
| Elongation at break (percent) | 35 | 27 | 20 |
| Melt Flow Index (grams/10 minutes) | 0.53 | 0.38 | 1.22 |
| Charpy Test, at room temperature | >11.44 | >11.44 | >11.44 |

What is claimed is:

1. A process of preparing a thermoplastic, high impact resistant transparent interpolymer of substantially predetermined composition within the approximate ranges 16–20 weight percent of butadiene-1,3, 28–33 weight percent of acrylonitrile and 47–54 weight percent of styrene, which comprises forming a solution of a solution-polymerized block copolymer of butadiene and styrene having at least 3 polymeric blocks and having terminal blocks of polymerized styrene, styrene monomer, acrylonitrile monomer, and an aromatic hydrocarbon solvent, in said solution the weight ratio of acrylonitrile to styrene being from 4.5:1 to 1.2:1 and the aromatic solvent being present at about one half the combined weight of said acrylonitrile monomer plus said styrene monomer, polymerizing this solution by free radical polymerization to substantially predetermined conversion of from 20–40%, and recovering the graft interpolymer so formed.

2. A process as claimed in claim 1 wherein the block copolymer is of general form polystyrene-polybutadiene-polystyrene, prepared by the step-wise addition method.

3. A process as claimed in claim 1 wherein the block copolymer is an overlap block copolymer of general form polystyrene-poly(butadiene/styrene)-polystyrene.

4. A process as claimed in claim 1 wherein the block copolymer is of general form polystyrene-polybutadiene-polystyrene prepared by coupling living two-block copolymers.

5. A process as claimed in claim 1 wherein the block coolymer is a star-shaped block copolymer in which three or more linear two-block copolymer branches radiate from a common centre.

6. A process as claimed in claim 1 wherein the aromatic hydrocarbon solvent is ethyl benzene.

References Cited

UNITED STATES PATENTS

| 3,264,375 | 8/1966 | Jones | 260—880 |
| 3,337,650 | 8/1967 | Marcil | 260—880 |
| 3,442,981 | 5/1969 | Stafford et al. | 260—880 |
| 3,344,205 | 9/1967 | Grey et al. | 260—880 |
| 3,459,700 | 8/1969 | Richards | 260—880 |

FOREIGN PATENTS

| 979,652 | 1/1965 | Great Britain | 260—880 |

JAMES A. SEIDLECK, Primary Examiner

U.S. Cl. X.R.

260—879